United States Patent
Laptyeva et al.

(10) Patent No.: US 11,495,801 B2
(45) Date of Patent: Nov. 8, 2022

(54) HIGH-STRENGTH BATTERY ELECTRODE FOIL FOR THE PRODUCTION OF LITHIUM-ION ACCUMULATORS

(71) Applicant: Speira GmbH, Grevenbroich (DE)

(72) Inventors: Galyna Laptyeva, Alfter (DE); Ulrich Hampel, Grevenbroich (DE); Volker Denkmann, Kempen (DE)

(73) Assignee: Speira GMBH, Grevenbroich (DE)

( * ) Notice: Subject to any disclaimer, the term of this patent is extended or adjusted under 35 U.S.C. 154(b) by 330 days.

(21) Appl. No.: 16/760,307

(22) PCT Filed: Nov. 20, 2018

(86) PCT No.: PCT/EP2018/081900
§ 371 (c)(1),
(2) Date: Apr. 29, 2020

(87) PCT Pub. No.: WO2019/101730
PCT Pub. Date: May 31, 2019

(65) Prior Publication Data
US 2020/0266449 A1 Aug. 20, 2020

(30) Foreign Application Priority Data
Nov. 21, 2017 (DE) .......................... 102017127441.3

(51) Int. Cl.
*H01M 4/66* (2006.01)
*C22C 21/00* (2006.01)
*H01M 10/052* (2010.01)
*B22D 7/00* (2006.01)
*B22D 21/00* (2006.01)

(52) U.S. Cl.
CPC ............. *H01M 4/662* (2013.01); *C22C 21/00* (2013.01); *H01M 4/661* (2013.01); *H01M 4/663* (2013.01);
(Continued)

(58) Field of Classification Search
CPC ...... B22D 21/007; B22D 7/005; C22C 21/00; H01M 10/052; H01M 4/66; H01M 4/661; H01M 4/662; H01M 4/663; Y02E 60/10
See application file for complete search history.

(56) References Cited

U.S. PATENT DOCUMENTS
2014/0205900 A1  7/2014  Seki et al.
2020/0328426 A1  10/2020  Laptyeva et al.

FOREIGN PATENT DOCUMENTS
CN  103436746  12/2013
CN  104220614 A  12/2014
(Continued)

OTHER PUBLICATIONS

Isoyama et al., (1985) "Surface Physical Properties and Adhesion Functions of Aluminum Materials", Light Metals, vol. 35, No. 3, p. 176-187.
(Continued)

*Primary Examiner* — Lingwen R Zeng
(74) *Attorney, Agent, or Firm* — Carol L. Francis; Rudy J. Ng; Bozicevic, Field & Francis LLP

(57) ABSTRACT

The invention relates to a battery electrode foil comprising an aluminium alloy, wherein the aluminium alloy has the following composition in weight percent: Si: 0.07-0.12% by weight, Fe: 0.18-0.24% by weight, Cu: 0.03-0.08% by weight, Mn: 0.015-0.025% by weight, Zn: ≤0.01% by weight, Ti: 0.015-0.025% by weight, Zn: ≤0.01% by weight, Ti: 0.015-0.025% by weight, Mn: 0.015-0.025% by weight, Zn: ≤0.01% by weight, Ti: 0.015-0.025% by weight, wherein the aluminium alloy can contain impurities up to a maximum of 0.01% in each case, up to a maximum of 0.03% in total, but the proportion of aluminium must be at least 99.5% by weight; wherein the battery electrode foil has intermetallic phases of a diameter length of 0.1 to 1.0 μm with a density of ≤9500 particles/mm². The invention further
(Continued)

relates to a process for the production of a battery electrode foil, its use for the production of accumulators, and accumulators containing the battery electrode foil.

21 Claims, 4 Drawing Sheets

(52) U.S. Cl.
    CPC ............ *B22D 7/005* (2013.01); *B22D 21/007* (2013.01); *H01M 4/66* (2013.01); *H01M 10/052* (2013.01); *Y02E 60/10* (2013.01)

(56) References Cited

FOREIGN PATENT DOCUMENTS

| | | | |
|---|---|---|---|
| CN | 104245980 | A | 12/2014 |
| CN | 104357722 | A | 2/2015 |
| CN | 104611616 | | 5/2015 |
| CN | 105063520 | | 11/2015 |
| CN | 106929713 | | 7/2017 |
| CN | 106929713 | A * | 7/2017 |
| CN | 107099701 | | 8/2017 |
| EP | 2738850 | | 1/2015 |
| EP | 2738849 | | 7/2015 |
| EP | 2857535 | | 11/2018 |
| JP | 2014-205886 | | 10/2014 |

OTHER PUBLICATIONS

Speira GMBH; JP Office Action for JP 2020-545456 "Battery Electrode Foil for the Production of Lithium-Ion Accumulators", Feb. 22, 2022, 9 pages English Translation 11 pages.

* cited by examiner

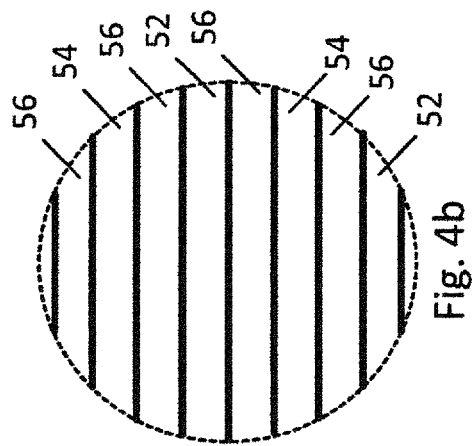
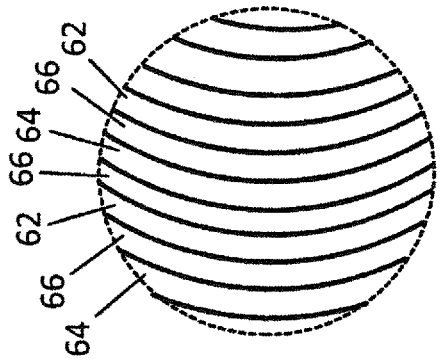
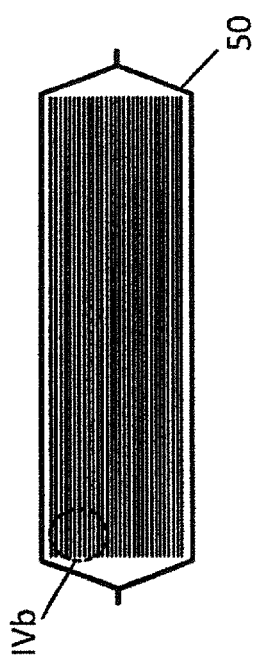
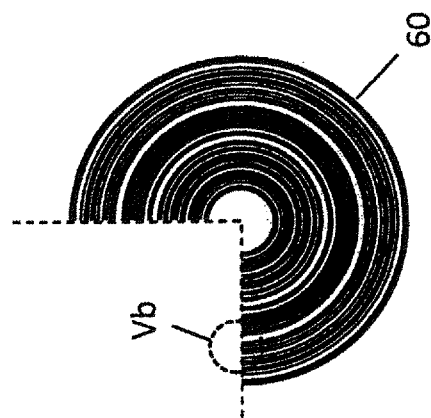

HIGH-STRENGTH BATTERY ELECTRODE FOIL FOR THE PRODUCTION OF LITHIUM-ION ACCUMULATORS

FIELD OF INVENTION

The invention relates to a battery electrode foil comprising an aluminium alloy, wherein the aluminium alloy has the following composition in % by weight: Si: 0.07-0.12% by weight, Fe: 0.18-0.24% by weight, Cu: 0.03-0.08% by weight, Mn: 0.015-0.025% by weight, Zn: ≤0.01% by weight, Ti: 0.015-0.025% by weight, Zn: ≤0.01% by weight, Ti: 0.015-0.025% by weight, Mn: 0.015-0.025% by weight, Zn: ≤0.01% by weight, Ti: 0.015-0.025% by weight, wherein the aluminium alloy can contain impurities up to a maximum of 0.01% in each case, up to a maximum of 0.03% in total, but the proportion of aluminium must be at least 99.5% by weight; wherein the battery electrode foil has intermetallic phases of a diameter length of 0.1 to 1.0 μm with a density of ≤9500 particles/mm$^2$. The invention further relates to a process for the production of a battery electrode foil, its use for the production of accumulators, and accumulators containing the battery electrode foil.

TECHNOLOGICAL BACKGROUND

Lithium-ion accumulators in their core consist of alternating anode and cathode layers arranged one above the other and separated by separator layers. For the cathode layers, aluminium foil coated with Li-containing electrode paste is typically used. The anode layer can be a graphite-coated copper foil, for example, and the separator layer can be a polymer layer permeable to Li ions.

In the cathode layer, the aluminium foil serves on the one hand as a carrier or substrate for the electrode paste and on the other hand to dissipate the current, i.e. as a so-called current collector.

In the state of the art, aluminium foils made of pure aluminium materials, such as EN AW1085, are typically used as current collectors for lithium-ion accumulators, as these have better conductivity than higher alloyed materials. However, the pure aluminium materials naturally have unfavourable mechanical properties, which can have a negative effect on the processability and/or the service life of the lithium-ion accumulator.

In the production of the cathode layer, the electrode paste is applied to the aluminium foil and then pressed through a roller system in a calendering process. Furthermore, in the manufacture of wound accumulators, the aluminium foil is wound tightly together with the other layers of the accumulator with relatively small bending radii. During these steps in the production process, the aluminium foil is subjected to high mechanical stresses, which frequently led to wrinkling or tearing of the foils in the case of the foils made of high-purity aluminium alloys used up to now. The mechanical stress can also lead to premature failure of the lithium-ion accumulator.

In addition, the material-related disadvantages limit further thinning of the foil to lower thicknesses, which would be desirable to increase the energy density of the accumulator.

From EP 2 857 535, aluminium materials for current collector foils with higher strengths are known; however, these are higher alloyed aluminium alloys with aluminium contents of less than 99.0%. On the one hand, this leads to poorer conductivity and, on the other, to higher costs for the higher contents of alloying by-products. Alloying by-products are the elements that are contained in the aluminium alloy in addition to aluminium, e.g. Si, Cu, Fe, Ti etc.

EP 2 738 849 and EP 2738 850 reveal aluminium alloy foils for electrode collectors and manufacturing processes. The aluminium foils described therein were produced by a continuous casting process and have high densities for intermetallic phases with a diameter length of 0.1 to 1.0 μm.

Against this background, the present invention is based on the object of providing a battery electrode foil as well as a process for the production of a battery electrode foil, which combine the cost and conductivity advantages of the low-alloy foils used so far with the better mechanical properties of higher-alloy foils.

SUMMARY OF THE INVENTION

To solve this problem, a battery electrode foil comprising an aluminium alloy is provided, wherein the aluminium alloy has the following composition in weight percent:
Si: 0.07-0.12% by weight,
Fe: 0.18-0.24% by weight,
Cu: 0.03-0.08% by weight,
Mn: 0.015-0.025% by weight,
Zn: ≤0.01% by weight,
Ti: 0.015-0.025% by weight,
wherein the aluminium alloy can contain impurities of up to a maximum of 0.01% in each case, in total up to a maximum of 0.03%,
wherein the remaining weight % are aluminium, but the aluminium content must be at least 99.5% by weight;
wherein the battery electrode foil has intermetallic phases of a diameter length of 0.1 to 1.0 μm with a density of ≤9500 particles/mm$^2$.

The inventors recognized that by processing the above aluminium alloy adapted to the specific alloy composition, an aluminium foil can be provided which is characterised by a low density of the phase of a diameter length of 0.1 to 1.0 μm and has both high strength and good electrical conductivity.

Preferred embodiments refer to battery electrode foil whose intermetallic phases have a diameter length of 0.1 to 1.0 μm with a density of ≤7000 particles/mm$^2$.

The battery electrode foils according to the invention are therefore characterised in particular by good electrical conductivity and at the same time high mechanical strength. The battery electrode foil can have a minimum electrical conductivity of >56% IACS, in particular of approximately 56% IACS. Furthermore, the battery electrode foil can have a tensile strength (in direction of rolling and transverse to the direction of rolling) Rm >250 MPa.

Typically, the battery electrode foil shows a surface roughness Ra of 0.07 to 0.22 μm on both sides. Preferably, the difference in surface roughness Ra on both sides of the battery electrode foil is 0.03 μm maximum.

In particular, the battery electrode foil has a carbon coating of <5 mg/m$^2$. In some embodiments the surface tension of the battery electrode foil is >30 dyn/cm, such as >32 dyn/cm.

Usually the battery electrode foil has a thickness of 8 to 20 μm, preferably 12 μm.

The battery electrode foil, especially with a thickness of 12 μm, can exhibit the following mechanical properties:
Rm (in direction of rolling): ≥250 MPa,
Rm (transverse to rolling direction): ≥250 MPa,
Rp0.2 (in rolling direction): ≥200 MPa,
Rp0.2 (transverse to rolling direction): ≥200 MPa,
A100 (in rolling direction): ≥2.0%,
A100 (transverse to rolling direction) ≥2.0%.

To achieve its properties, the battery electrode foil is characterised in that the Fe/Si ratio is in the range of 1.5 to 3.5 and the Cu/Ti ratio is in the range of 2 to 5.

Another aspect of the invention relates to a method for manufacturing a battery electrode foil (12, 22),
in which an aluminium hot strip (8) with a hot strip thickness of at least 2.5 mm is provided from an aluminium alloy as described in claims 1, 10 and 11, and
in which the aluminium hot strip (8) is cold rolled in several cold rolling passes (K1, Kx, Kx+1, Ky, Ky+1, Kn) to a final thickness of 8 to 20 µm,
wherein cold rolling is carried out from an initial thickness of at least 1 mm without intermediate annealing.

Typically, cold rolling from hot strip thickness to final thickness is carried out without intermediate annealing.

The inventors recognized that the processing of the aluminium alloy described above by a process that is not a continuous casting process, in particular by the method described above, aluminium foil, especially battery electrode foil, can be produced with a high mechanical strength and good conductivity.

In particular, the process involves cold rolling to a final thickness of 8 to a maximum of 20 µm, preferably 12 µm.

In some embodiments, the degree of rolling per cold rolling pass from an initial thickness of at least 0.55 mm, preferably at least 1.5 mm, is at most 60%.

In particular embodiments of the method, the aluminium strip with a thickness of at least 0.1 mm, preferably at least 0.2 mm, is cooled between two cold rolling passes, in particular to a temperature not exceeding 50° C.

The aluminium strip can be cold-rolled in one layer up to its final thickness.

Consequently, a further aspect of the invention relates to a battery electrode foil manufactured according to the method described herein.

A further aspect of the invention relates to the use of a battery electrode foil as a current collector foil, in particular for the manufacture of an accumulator, in particular a lithium-ion accumulator.

Another aspect of the invention relates to an accumulator, in particular a lithium-ion accumulator, with a current collector consisting of a battery electrode foil of the invention.

DESCRIPTION OF THE DRAWINGS

FIG. 4a-b Schematic diagram of the layer structure of a lithium-ion accumulator in flat design FIG. 5a-b Schematic diagram of the layer structure of a lithium-ion accumulator in cylindrical design.

DESCRIPTION OF PREFERRED EMBODIMENTS

Figure 1:
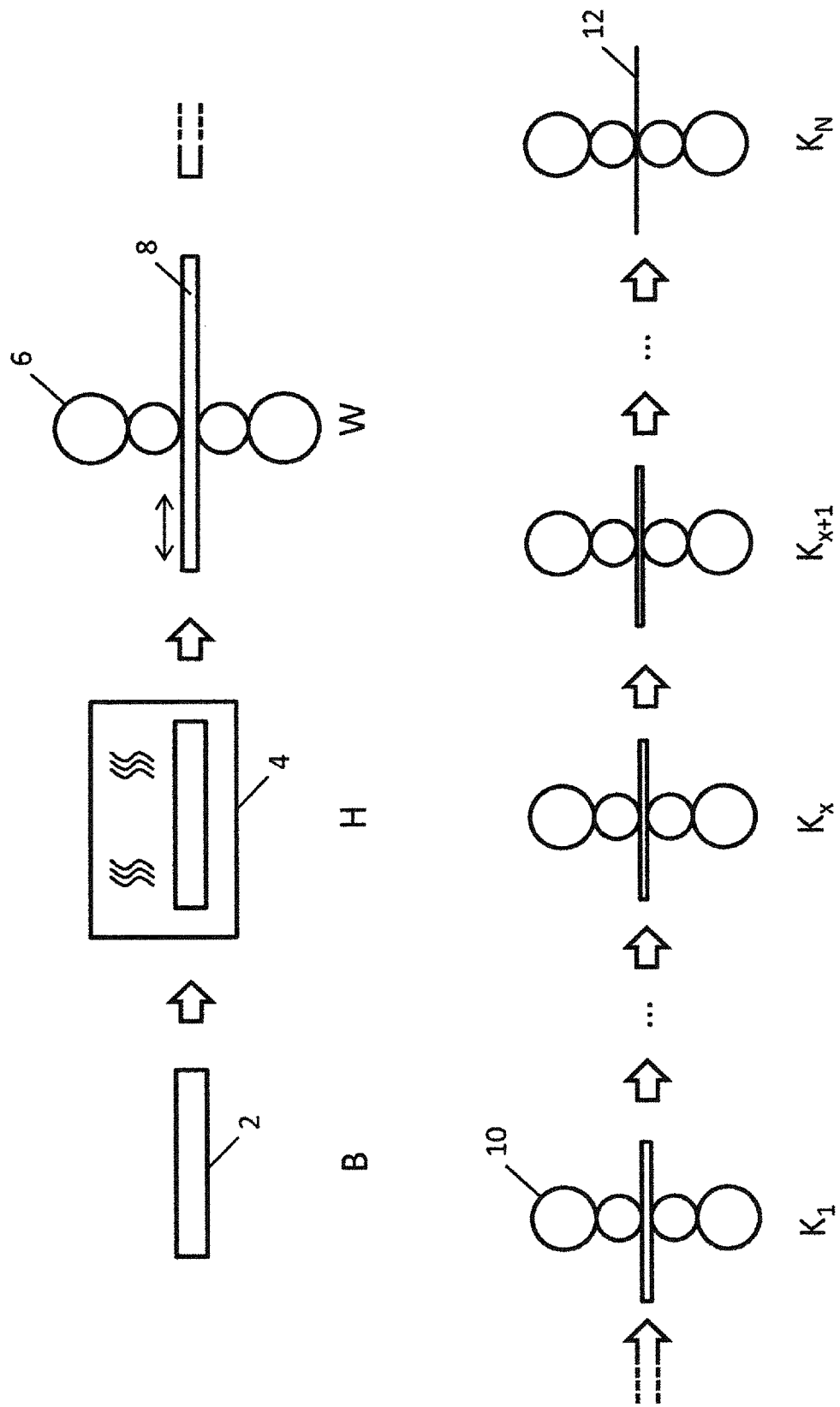
FIG. 1 First embodiment of the method according to the invention

It should be noted that "comprising" does not exclude other elements or steps and "a" or "an" does not exclude a multitude. It should also be noted that features or steps described in reference to one of the embodiments can also be used in combination with other features or steps of other described embodiments.

It was found that higher strengths can be achieved with this aluminium alloy than with a previously used alloy of type 1050 or 1085, despite the low contents of alloying by-products. In particular, it was found that aluminium strips made from this aluminium alloy can be easily strengthened by cold rolling, especially by foil rolling, i.e. cold rolling from an initial thickness of 200 µm, so that higher strengths to final thickness can be achieved. In contrast, previously used 1050 alloys could hardly be strengthened by foil rolling. Tests have shown that the Rp0.2 value of aluminium strip made of previously used 1050 alloys can be increased from typically 50-70 MPa in hot strip to approx. 150-175 MPa by cold rolling, whereby only slight increases in strength can be achieved by foil rolling from an initial thickness of approx. 200 µm. In contrast, the alloys described above also achieved significant increases in strength during foil rolling, so that an aluminium foil with an Rp0.2 value of e.g. 240 MPa can be produced with a final thickness of e.g. 12 µm or 15 µm. It was also found that aluminium foil can be produced from the aluminium alloy by the processing described above. This aluminium foil is characterised by a low density of phases of the diameter length of 01, to 1.0 µm and has good electrical conductivity. This makes these aluminium foils particularly suitable as battery electrode foils for the manufacture of accumulators, especially lithium-ion accumulators.

The aluminium alloy has a silicon content of 0.07 to 0.12% by weight and an iron content of 0.18 to 0.24% by weight. These ranges have been found to be suitable for the desired properties of an aluminium foil made from the aluminium alloy. With the indicated Si and Fe contents, a favourable Fe—Si ratio in the range 1.5 to 3.5 is also achieved. Higher Fe—Si ratios result in higher proportions of the AlFe phase in the foil, which is disadvantageous for the mechanical properties of the foil. The Fe—Si ratio is the ratio of the Fe content in weight percent to the Si content in weight percent.

By limiting the Fe content to a maximum of 0.24% by weight, it is also achieved that the aluminium foil produced from the alloy has good corrosion stability, i.e. has a low tendency to corrosion. This is a particular advantage over aluminium foil made from higher-alloy aluminium alloys, which also achieve quite good strength levels, but have a much greater tendency to corrode.

The aluminium alloy also has a copper content of 0.03 to 0.08% by weight, a manganese content of 0.015 to 0.025% by weight, a zinc content of max. 0.01% by weight and a titanium content of 0.015 to 0.025% by weight. It was found that by the precise joint adjustment of the elements Cu, Ti, Mn and Zn in the respective ranges indicated, a low-alloy aluminium alloy is obtained which can nevertheless be strengthened well by cold forming, in particular by foil rolling.

In particular, the selected contents of copper, titanium and manganese result in good mixed crystal solidification, so that aluminium foils made from this alloy exhibit improved strength compared to corresponding aluminium foils made from previously used 1050 alloys.

In addition, due to their solubility limits, Cu and Mn, but also Si, remain largely in solution, i.e. in the aluminium matrix, and exert a reactive force on static and dynamic recovery. With the stated contents for Cu, Mn and Si, this allows a continuous increase in strength through work-hardening. Furthermore, the described composition leads to a better thermostability of the aluminium foil, since the softening of the aluminium foil during heat treatment is inhibited by the dissolved elements.

The alloy described here is a 1050 or 1100 alloy depending on the copper content. Although the 1050 specification generally allows Cu, Mn and Zn contents of up to 0.05% by weight the actual impurity contents of these elements are generally far below this for typical 1050 alloys. In order to achieve the alloy composition described here, the elements Cu, Mn and Zn in particular are therefore specifically added.

With the specified contents for copper and titanium, a favourable Cu—Ti ratio of 2 to 5 is also achieved. This allows a higher conductivity of the alloy to be achieved. Ti has a significantly higher element specific resistance coefficient than Cu. A Cu—Ti ratio of at least 2 can compensate for the negative effect of Ti on the conductivity by Cu. At the same time, this compensation means that it is not necessary to dispense with Ti completely, so that Ti or Ti-containing grain refiner, e.g. titanium boride, can be added.

According to the invention, the above-mentioned problem is further solved by a method for producing an aluminium foil, in particular a battery electrode foil, in which an aluminium hot strip with a hot strip thickness of at least 3 mm is provided from the aluminium alloy described above and in which the aluminium hot strip is cold-rolled in several cold-rolling passes to a final thickness of at least 8 and at most 20 μm, the cold-rolling being carried out from an initial thickness without intermediate annealing. Furthermore, according to the invention, the task is solved by an aluminium foil produced by this process.

Foil rolling without intermediate annealing of the alloy according to the invention results in higher strength in combination with good electrical conductivity. Phase analysis shows that this embodiment has a low density of phases with a diameter length of 0.1 to 1.0 μm. The density of the phases was determined on the scanning electron microscope at a magnification of 1000× and with an acceleration voltage of 10 kV; samples for this investigation were mechanically prepared with OPS (oxide polishing suspension).

TABLE 1

| Foil thickness | Number of phases (diameter length 0.1-1.0 μm)/mm$^2$ |
| --- | --- |
| 15 μm | 4 × 10$^3$ |
| 12 μm | 3 × 10$^3$ |

The diameter lengths specified here refer to the maximum diameter lengths of the particles. The particles are shown as two-dimensional particles in the scanning electron microscope images. The longest diameter to be detected in this two-dimensional representation represents the maximum diameter length.

Therefore, a major aspect of the invention is to provide a battery electrode foil comprising an aluminium alloy, wherein the aluminium alloy has the following composition in weight percent:
Si: 0.07-0.12% by weight,
Fe: 0.18-0.24% by weight,
Cu: 0.03-0.08% by weight,
Mn: 0.015-0.025% by weight,
Zn: ≤0.01% by weight,
Ti: 0.015-0.025% by weight,
wherein the aluminium alloy can contain impurities of up to a maximum of 0.01% in each case, in total up to a maximum of 0.03%,
wherein the remaining weight % are aluminium, but the aluminium content must be at least 99.5% by weight;
wherein the battery electrode foil has intermetallic phases of a diameter length of 0.1 to 1.0 μm with a density of ≤9500 particles/mm$^2$.

The expert is familiar with methods for determining the diameter length of the intermetallic phases. For example, the diameter length can be measured using a field emission scanning electron microscope (Zeiss Merlin) with B2D4 detector (pneumatically operated detector for field emission scanning electron microscope) at a magnification of 1000× and an acceleration voltage of 10 kV.

Particular embodiments refer to a battery electrode foil with a strip thickness of ≤15 μm, which has intermetallic phases of a diameter length of 0.1 to 1.0 μm with a density of ≤9500 particles/mm$^2$, preferably ≤7000 particles/mm$^2$, such as ≤6000 particles/mm$^2$ or ≤5000 particles/mm$^2$, particularly preferably ≤4000 particles/mm$^2$.

In particular, the battery electrode foil with a strip thickness of ≤15 μm, the intermetallic phases of a diameter length of 0.1 to 1.0 of ≤4000 particles/mm$^2$, measured at a magnification of 1000× and an acceleration voltage of 10 kV.

Particular embodiments refer to battery electrode foil with a strip thickness of ≤12 μm, which has intermetallic phases of a diameter length of 0.1 to 1.0 μm with a density of ≤9500 particles/mm$^2$, preferably ≤7000 particles/mm$^2$, such as ≤6000 particles/mm$^2$, ≤5000 particles/mm$^2$ or ≤4000 particles/mm$^2$, particularly preferably ≤3000 particles/mm$^2$. In particular, the battery electrode foil with a strip thickness of ≤12 μm, which has intermetallic phases with a diameter length of 0.1 to 1.0 of ≤3000 particles/mm$^2$, measured at a magnification of 1000× and an acceleration voltage of 10 kV.

Typically, the battery electrode foil has intermetallic phase of a diameter length of 0.1 to 1.0 μm with a density of at least 100 particles/mm$^2$, at least 1000 particles/mm$^2$.

In particular embodiments, the battery electrode foil has an intermetallic phase of a diameter length of ≥1.0 μm with a density of at least 2000 particles/mm$^2$. In particular, a battery electrode foil with a strip thickness of ≤12 μm can exhibit intermetallic phases with a diameter length of ≥1.0 μm with a density of at least 3000 particles/mm$^2$, preferably at least 4000 particles/mm$^2$. In particular, a battery electrode foil with a strip thickness of ≤12 μm can have intermetallic phases with a diameter length of ≥1.0 μm with a density of at least 4000 particles/mm$^2$, measured at a magnification of 1000× and an acceleration voltage of 10 kV.

In particular, battery electrode foil with a strip thickness of ≤15 μm, the intermetallic phases can have a diameter length of ≥1.0 μm a density of at least 3000 particles/mm$^2$, preferably at least 4000 particles/mm$^2$. In particular, a battery electrode foil with a strip thickness of ≤15 μm can have intermetallic phases with a diameter length of ≥1.0 μm and a density of at least 4000 particles/mm$^2$, measured at a magnification of 1000× and an acceleration voltage of 10 kV.

It was found that an aluminium strip made of the alloy described above can be strengthened by cold rolling and foil rolling from a thickness of at least 3 mm to at least 8 and at most 20 μm in such a way that the strength values achieved at final thickness clearly exceed the strength values of previous 1050 alloys. In particular, this method can be used to achieve strengths in aluminium foil for which previously higher-alloy alloys had to be used. The aluminium foil produced by this process thus exhibits increased strength combined with good conductivity due to the low content of alloying elements. Compared to higher-alloyed alloys, the production costs can also be kept low, since less material has to be added to achieve the required alloy by-product contents. Furthermore, aluminium foil has improved corrosion stability compared to foil made of higher alloyed aluminium foils.

As a result, aluminium foil is particularly suitable for the manufacture of accumulators, especially lithium-ion accumulators. Accordingly, the above-mentioned problem is further solved, according to the invention, by using the above-mentioned aluminium alloy for the manufacture of accumulators, in particular lithium-ion accumulators, as well as by using the above-mentioned aluminium foil as current collector foil, in particular for the manufacture of an accumulator, in particular a lithium-ion accumulator. In addition, the above-mentioned problem is solved by an accumulator, in particular a lithium-ion accumulator, with a current collector made of the aluminium foil described above.

The method provides a hot-rolled aluminium strip with a hot-rolled thickness of at least 3 mm made of the above-mentioned alloy. The hot strip thickness is understood to be the thickness of the aluminium strip that is reached at the end of hot rolling. The aluminium hot strip can be produced, for example, by casting an ingot from a melt with the aforementioned alloy composition and hot rolling it to a thickness of 3 mm or more after an optional homogenisation treatment. The hot strip temperature, i.e. the temperature of the hot strip immediately after the last hot strip pass, is typically in the range between 300° C. and 350° C., for example 330° C.

The hot-rolled aluminium strip is cold-rolled in several cold rolling passes to a final thickness of 8 to a maximum of 20 μm. The number of cold rolling passes can be adjusted as required, but is preferably at least seven.

Cold rolling is carried out from an initial thickness of at least 1 mm, preferably at least 2 mm, in particular at least 3 mm, without intermediate annealing. This means that the aluminium strip with a thickness of at least 1 mm, preferably at least 2 mm, in particular at least 3 mm, is not (no longer) subjected to intermediate annealing between two cold rolling passes.

Preferably, no intermediate annealing is carried out from hot strip thickness onwards, i.e. cold rolling is preferably carried out completely without intermediate annealing.

The initial thickness is understood to be the thickness of the aluminium strip before the relevant cold rolling pass. A pass is understood to be the single rolling of a strip.

Intermediate annealing leads to an at least partial recrystallization of the aluminium strip or to a reduction of dislocations and counteracts material hardening. By dispensing with intermediate annealing from a certain initial thickness onwards, good hardening can be achieved through the strong forming of the strip, so that the aluminium strip or aluminium foil has good strength at final thickness.

In contrast, cold rolling or, in particular, foil rolling is typically carried out with intermediate annealing in the case of strip made of normal 1050 alloys, especially since no significant strengthening can be achieved by foil rolling with the normal 1050 alloys anyway.

In the following, different types of aluminium alloy, the method, the aluminium foil, its use and the accumulator are described. The individual embodiments are applicable to the aluminium alloy, the process, the aluminium foil, its use and the accumulator and can also be combined with each other.

In a first embodiment, the Fe—Si ratio of the aluminium alloy is in the range 1.9 to 3.5. In this way, favourable strength properties of the aluminium foil can be achieved. In particular, the AlFe phase, which is disadvantageous for the mechanical properties, can be limited to a proportion of about 0.4%. Corresponding alloys with an Fe—Si ratio of 3.5 or more, on the other hand, have a proportion of AlFe phase which is about twice as high (about 0.8%). In addition, an Fe—Si ratio in the above-mentioned range favours partial dissolution of the phases in the temperature range of 400-500° C. and the formation of AlFeSi dispersoids, which are advantageous for the elongation properties of the aluminium foil.

In another design, the Cu—Ti ratio of the aluminium alloy is in the range of 2.5 to 5, resulting in good hardening during cold rolling.

In another embodiment of the method, the hot strip thickness is in the range 3-5 mm. With a minimum hot strip thickness of 4 mm, it was possible to achieve good work-hardening during subsequent cold rolling to the desired final thickness. Preferably, cold rolling is carried out from hot strip thickness without intermediate annealing. At a hot strip thickness of more than 5 mm, the hot strip is difficult to handle, in particular to coil.

In another embodiment, cold rolling from hot strip thickness to final thickness is carried out without intermediate annealing. In this design, intermediate annealing between the cold rolling passes is therefore generally dispensed with, irrespective of the initial thickness. In this way, improved hardening of the aluminium strip can be achieved by cold rolling.

In another embodiment, cold rolling is carried out to a final thickness of 8 to 20 μm, preferably a maximum of 15 μm, in particular a maximum of 10 to 12 μm. In a corresponding embodiment of the aluminium foil, the latter has a thickness of 8 to 20 μm, preferably a maximum of 15 μm, in particular a maximum of 12 μm. The alloy described above can be used to produce aluminium foil of small thickness but with high strength so that it does not crack when processed into accumulators. This saves material and weight and increases the energy density of the accumulators.

In another embodiment, the degree of rolling per cold rolling pass is at most 60% from an initial thickness of at least 0.7 mm, preferably from an initial thickness of at least 1.5 mm. The degree of rolling per cold rolling pass is thus limited to a maximum of 60% before the initial thickness falls below a value of 0.7 mm or preferably 1.5 mm.

The degree of rolling A of a cold rolling pass is the change in thickness due to the cold rolling pass, i.e. the difference between the strip thickness after the cold rolling pass $d_{after}$ and the initial thickness $d_{before}$, in relation to the initial thickness $d_{before}$, expressed as a percentage:

$$A = (d_{before} - d_{after})/d_{before}$$

If, for example, the strip is rolled from 200 μm to 100 μm in a cold rolling pass, the degree of rolling results in: A=(200 μm−100 μm)/200 μm=0.5=50%.

It was found that the heat input caused by cold rolling can heat the aluminium strip to such an extent that significant softening occurs. This is prevented by limiting the degree of rolling to a maximum of 60% from an initial thickness of at least 0.7 mm, preferably at least 1.5 mm, so that better strengths of the strip at final thickness can be achieved.

In another embodiment, the aluminium strip is cooled from a thickness of at least 0.1 mm, preferably at least from a thickness of at least 0.2 mm, between two cold rolling passes, in particular to a temperature not exceeding 50° C. In this way, the thermal energy introduced into the strip by the cold rolling process can be dissipated between the individual cold rolling passes so that the temperature of the aluminium strip does not rise excessively over several cold rolling passes, which would lead to the strip becoming softer. As a result, higher strengths at final thickness can be achieved. As the heat rise per cold rolling pass is critical, especially for thinner strip thicknesses, the process is carried out by starting the cooling step between two cold rolling passes before the initial thickness falls below 0.7 mm, preferably 1.5 mm.

To cool the aluminium strip, it can be stored between two cold rolling passes, for example, for at least 24 hours, preferably at room temperature. This allows the strip to be cooled from typically 80° C. to 100° C. to a maximum of 50° C. immediately after a cold rolling pass.

In another embodiment, the aluminium strip is cold-rolled in a single layer to its final thickness. This means that the aluminium strip is not doubled, even with thin starting thicknesses, as is usually the case in the production of aluminium foil. As a result of the single-ply cold rolling to final thickness, the aluminium foil has a similar texture on both sides, in particular comparable roughness, which has a positive effect on the uniform coatability of the aluminium foil.

In addition, single layer rolling to final thickness can reduce the amount of rolling oil required compared to double rolled aluminium foil, as double layer rolling requires a considerable amount of rolling oil to be applied between the two aluminium layers in order to separate them after rolling. Single-layer rolling thus allows organic impurities on the strip surface to be reduced, preferably to a residual rolling oil coating of no more than 5 mg carbon per square meter, which has proved advantageous when using the aluminium foil for the manufacture of lithium-ion accumulators.

In another embodiment, the aluminium foil, especially with a maximum thickness of 15 μm, has the following mechanical properties, especially in the roll-hardened state:
Rm (in rolling direction): ≥280 MPa,
Rm (transverse to the rolling direction): ≥280 MPa,
Rp0.2 (in rolling direction): ≥240 MPa,
Rp0.2 (transverse to the direction of rolling): ≥220 MPa,
A100 (in rolling direction): ≥2.6% and
A100 (transverse to the direction of rolling): ≥3.3%.

In another embodiment, an aluminium foil (with an Rm in rolling direction ≥280 MP in the initial state) has the following mechanical properties after heat treatment for 2 minutes at 150° C. (measured in the tensile test according to DIN 50154:1980-12 and DIN EN 546-2:2007-03):
Rm (in rolling direction): ≥270 MPa,
Rp0.2 (in rolling direction): ≥200 MPa and
A100 (in rolling direction): ≥2%.

In another embodiment, the aluminium foil, especially with a maximum thickness of 12 μm, has the following mechanical properties, especially in the roll-hardened state:
Rm (in direction of rolling): ≥250 MPa,
Rm (transverse to rolling direction): ≥250 MPa,
Rp0.2 (in rolling direction): ≥200 MPa,
Rp0.2 (transverse to rolling direction): ≥200 MPa,
A100 (in rolling direction): ≥2.0%,
A100 (transverse to rolling direction) ≥2.0%.

Rm is the tensile strength, Rp0.2 the 0.2% yield strength and A100 the elongation at break (with sample length 100 mm), each measured in a tensile test according to DIN 50154:1980-12 and DIN EN 546-2:2007-03.

The addition "in rolling direction" means that one tensile sample each with the sample length in rolling direction shall be used and the addition "transverse to rolling direction" means that one tensile sample each with the sample length transverse to rolling direction shall be used.

It was found that by using the alloy and method described above, a foil can be produced which has the above mentioned mechanical properties. In particular, the strength Rm is far above the strength values that have been achieved with the 1050 alloys used so far.

It was found that with the alloy described, good short-term thermal stability can be achieved at temperatures ≤150° C. of the aluminium foil, so that the aluminium foil has good mechanical properties even after such heat treatment. This is particularly advantageous when using the aluminium foil for the production of lithium-ion accumulators, since the aluminium foil has good strength values even after a drying process following coating with electrode material containing lithium.

In another embodiment, the aluminium foil has a roughness value Ra in the range of 0.07 to 0.22 μm on both sides, measured according to DIN EN ISO 4287:2010 (with a stationary roughness tester Hommel-Tester T8000 RC). Preferably, the roughness value Ra on one side of the aluminium foil differs from the roughness value Ra on the other side of the aluminium foil by a maximum of 0.03 μm. This can be achieved in particular by rolling the aluminium foil in one layer to final thickness. In this way, the aluminium foil can be coated more evenly on both sides.

In another embodiment, the aluminium foil has an electrical conductivity ≥56% IACS (International Annealed Copper Standard), determined by measuring resistance using a Wheatstone bridge. This good conductivity is achieved in particular by the low content of alloying by-products. In this way, the aluminium foil is well suited for current collectors. In special embodiments, the electrical conductivity is 55% to 63%, preferably 56% to 60%, particularly preferred 56% to 58%, such as 56%.

Further features and advantages of the present invention result from the following description of various embodiments, with reference to the attached drawing.

FIG. 1 shows a first embodiment of the procedure according to the invention.

In the method, an ingot 2 with the following composition is first cast in step B:
Si: 0.07-0.12% by weight
Fe: 0.18-0.24% by weight
Cu: 0.03-0.08% by weight
Mn: 0.015-0.025% by weight
Zn: max. 0.01% by weight
Ti: 0.015-0.025% by weight
Al: Rest, but at least 99.5% by weight,
unavoidable impurities individually ≤0.01% by weight, in total ≤0.03% by weight.

The ingot can then be subjected to an optional homogenisation treatment in a homogenisation furnace 4 (step H). After the homogenizing treatment, the ingot is hot-rolled in a reversing hot rolling mill 6 (indicated by the double arrow in FIG. 1) to form aluminium hot strip 8 with a hot strip thickness of between 3 and 5 mm (Step W).

After hot rolling, the aluminium hot strip 8 is cold-rolled in a cold rolling stand 10 in several cold rolling passes to a final thickness of for example 15 μm. FIG. 1 shows an example of the first cold rolling pass (step $K_1$), the last cold rolling pass (step $K_N$, where "N" stands for the total number of cold rolling passes) and two successive cold rolling passes (steps $K_x$ and $K_{x+1}$) between the first and last cold rolling passes. After cold rolling pass $K_x$, the aluminium strip has a thickness of at least 1 mm. The initial thickness for cold rolling pass Kx+1 is therefore 1 mm or more. Cold rolling pass $K_{x+1}$ follows cold rolling pass $K_x$ without intermediate annealing of the aluminium strip. Likewise, all further cold rolling passes follow each other until the last cold rolling pass without intermediate annealing. In this way, a high degree of solidification of the produced aluminium foil 12 is achieved via the individual cold rolling passes starting at $K_x$, without any intermediate annealing between the cold rolling passes resulting in a softening of the foil. Preferably, intermediate annealing is completely dispensed with during cold rolling. In addition, the degree of rolling of the individual cold rolling passes is limited to a maximum of 60% from an initial thickness of at least 1.5 mm.

Figure 2:
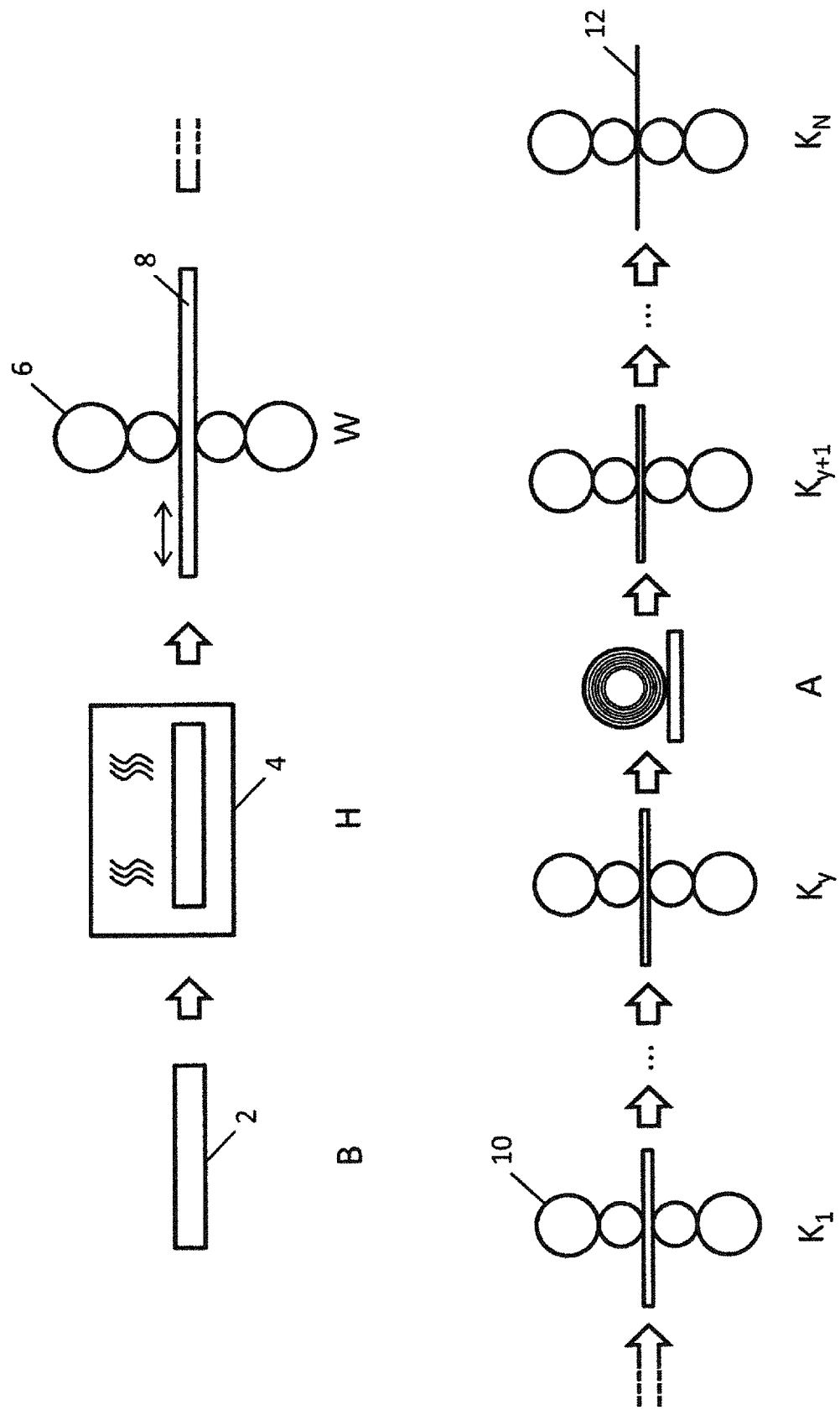
FIG. 2 Second embodiment of the method according to the invention

FIG. 2 shows an alternative embodiment of the procedure according to the invention, whereby identical components are provided with identical reference numbers. As with the method in FIG. 1, there is no intermediate annealing from an initial thickness of at least 1 mm and the degree of rolling is limited to a maximum of 60% from an initial thickness of at least 1.5 mm. The embodiment shown in FIG. 2 differs from the embodiment in FIG. 1 in that a cooling step A is provided between the individual cold rolling passes from a strip thickness of 0.1 mm (illustrated in FIG. 2 between $K_y$ and $K_{y+1}$).

Due to the forming energy introduced into the aluminium strip during cold rolling, the aluminium strip typically has a temperature in the range of 80° C.-100° C. immediately after a cold rolling pass. In cooling step A, the strip is stored as a coil at room temperature for a period of at least 24 hours and thus cools slowly to a temperature of less than 50° C. This avoids excessive heating of the aluminium strip over several successive cold rolling passes and the associated softening of the aluminium strip. As a result, the strength of the aluminium foil 12 at final thickness can be increased.

The aluminium foils produced with the method described above are particularly suitable for use as current collectors in the manufacture of lithium-ion accumulators.

Figure 3:
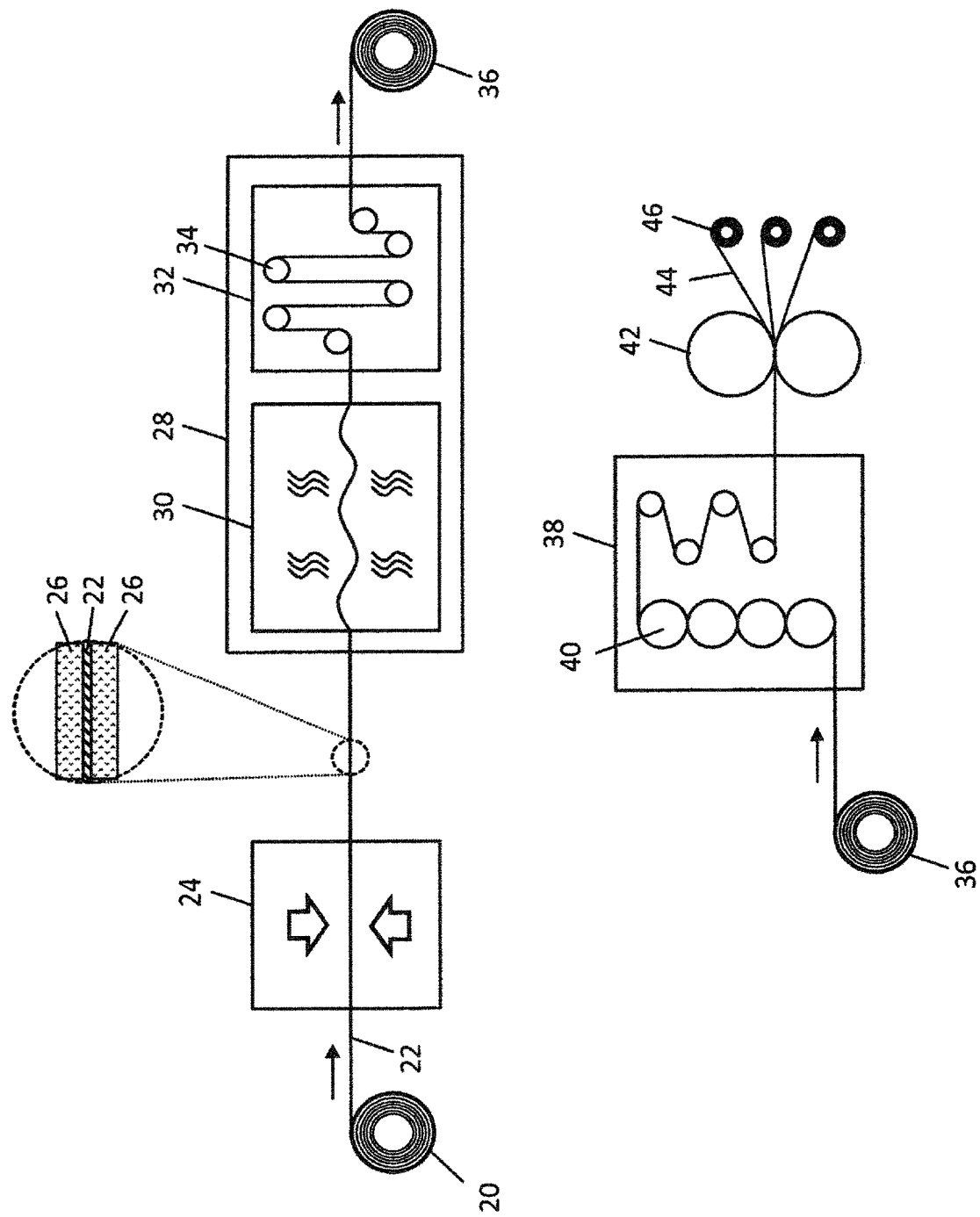
FIG. 3 Section of a method for the manufacture of lithium-ion accumulators

FIG. 3 illustrates the production of cathode layers for lithium-ion accumulators, from which the mechanical requirements for aluminium foil 12 can be seen.

In this method, an aluminium foil 22 is unwound from a coil 20, which serves as a carrier for the electrode material and current conductor. The aluminium foil 22 can, for example, be produced using the process shown in FIG. 1 or FIG. 2, e.g. foil 12.

The aluminium foil 22 is first fed to a coating device 24, in which the top and bottom sides of the foil are coated with a lithium-containing electrode material, for example by slot die coating. The coating 26 applied to the aluminium foil can have a layer thickness of up to 150 µm, which is many times the thickness of the aluminium foil 22.

The coated foil 22 is then fed to a drying device 28, in which the foil is first dried in a flotation dryer 30 and then cooled again in a cooling section 32, for example with cooling rollers 34. Drying is typically carried out in the air flotation dryer for 2 minutes at approx. 150° C. After cooling, the aluminium foil is wound into a coil 36.

Due to the large amount of electrode material applied to the aluminium foil, a high strength of the aluminium foil is desirable so that it does not tear, especially in the air flotation dryer 30. In addition, the aluminium foil should have sufficient thermal stability so that the required strength is still present after the drying treatment, i.e. after 2 min. at 150° C.

In a second process stage, the coated aluminium foil 22 is unwound again from coil 36 and passed through a calendering device 38, in which the coated aluminium foil 22 is pressed between calender rolls 40 to obtain a predetermined uniform thickness of coating 26.

The coated foil is then slit longitudinally into narrower strips 44 in a slitting device 42 and wound up into coils 46. The strips of coated aluminium foil produced in this way are cut or punched to the desired geometry in the following steps not shown and further processed into lithium-ion accumulators by stacking them on top of each other alternately with anode layers and separator layers arranged in between. This can be done for the manufacture of lithium-ion accumulators in flat design by successive stacking of the individual layers on top of each other or for the manufacture of lithium-ion accumulators in cylindrical design by winding a stack of one cathode and one anode layer each with separator layers.

FIG. 4a-b schematically shows the layered structure of a lithium-ion accumulator 50 in flat design in sectional view, with FIG. 4b showing an enlarged detail from FIG. 4a. The accumulator 50 has a stack of cathode layers 52, anode layers 54 and separator layers 56 arranged in between. The cathode layers 52 are made of the coated aluminium strip 44 shown in FIG. 3.

FIG. 5a-b schematically shows the layer structure of a lithium-ion accumulator 60 in cylindrical design in sectional view, with FIG. 5b showing an enlarged detail from FIG. 5a. To manufacture the accumulator 60, a stack consisting of a cathode layer 62, an anode layer 64 and two separator layers 66 was wound into a cylinder, so that in the finished accumulator 60 a large number of these layers are arranged alternately on top of each other.

Especially when winding the individual layers, they are subjected to high mechanical stress, so that a high strength of the aluminium foil used for the cathode layer is desirable. In the past, the use of low-strength aluminium foil made of 1050 alloys often resulted in damage to the foil during winding, which led to an interruption in the production process or to premature failure of the manufactured accumulator.

By using the higher strength aluminium foil described here, such production disturbances or premature failure of the accumulators during operation is prevented.

Tests have been carried out which show the advantages of the alloy and the manufacturing process described.

For this purpose, 45 mm thick rolling ingots were cast from the alloys A and B listed in Table 2, where A is an example of the embodiment of the alloy according to the invention and B is a comparative example.

TABLE 2

| | (all data in % by weight) | | | | | | | | | | |
|---|---|---|---|---|---|---|---|---|---|---|---|
| | Si | Fe | Cu | Mn | Zn | Ti | Mg | Pb | B | otherwise | Al |
| A | 0.11 | 0.20 | 0.05 | 0.02 | 0.01 | 0.02 | 0.02 | 0.001 | 0.001 | <0.001 | Rest |
| B | 0.04 | 0.08 | 0.00 | 0.00 | 0.01 | 0.02 | 0.00 | 0.001 | <0.001 | <0.001 | Rest |

The rolling ingots were each homogenized for 3 h at 600-610° C. and then rolled in a reversing hot rolling stand to form hot strip with a hot strip thickness of 4.5 mm and a hot strip temperature of approx. 330° C.

The hot-rolled strip of alloy A was then cold-rolled to a final thickness of 15 µm in a total of nine cold rolling passes with the parameters listed in Table 3 (hereinafter referred to as strip A).

TABLE 3

| Cold rolling pass no. | 1 | 2 | 3 | 4 | 5 | 6 | 7 | 8 | 9 |
|---|---|---|---|---|---|---|---|---|---|
| Initial thickness [mm] | 4.5 | 2.0 | 1.0 | 0.55 | 0.35 | 0.21 | 0.105 | 0.057 | 0.023 |
| Pass final thickness [mm] | 2.0 | 1.0 | 0.55 | 0.35 | 0.21 | 0.105 | 0.057 | 0.023 | 0.015 |
| Degree of rolling [%] | 56 | 50 | 45 | 36 | 40 | 50 | 46 | 60 | 32 |
| Storage for 24 h at RT before cold rolling pass | No | No | No | No | No | No | Yes | Yes | Yes |

Starting from an initial thickness of 0.105 mm, the strip was stored at room temperature for 24 h between the individual cold rolling passes, i.e. for the first time between cold rolling passes 6 and 7. The cold rolling was carried out without intermediate annealing.

Hot-rolled strip of alloy B was rolled in a corresponding manner to form cold-rolled strip, but with the last cold rolling pass to a final thickness of 20 µm (hereinafter referred to as strip B).

Samples of 100 mm length and 15 mm width were taken from both strips A and B at the final thickness (15 µm for A, 20 µm for B) in a roll-hardened condition, once in and once across the rolling direction for strip A and in the rolling direction for strip B. Some samples of strip A were also subjected to heat treatment for 2 min. at 150° C., which corresponds to the typical drying conditions after the application of electrode material in the manufacturing process for lithium-ion accumulators.

Tensile tests according to DIN 50154:1980-12 were performed on all samples. The results are summarized in Table 4 (Strip A: thickness 15 µm, Strip B: thickness 20 µm).

TABLE 4

| Test | Rm [MPa] | Rp0.2 [MPa] | A100 [%] |
|---|---|---|---|
| Strip A (in rolling direction) | 281 | 243 | 2.7 |
| Strip A (transverse to rolling direction) | 280 | 228 | 3.5 |
| Strip A (in rolling direction, after heat treatment) | 275 | 208 | 2.2 |
| Strip B (in rolling direction) | 174 | 139.3 | 3.23 |

The tests show that with the alloy and method described, it is indeed possible to achieve low-alloy aluminium foils with high strength. In particular, the values for Rm and Rp0.2 achieved in strip A clearly exceed the values achieved in strip B from the reference alloy. Furthermore, strip A shows particularly high strengths both in and transverse to the rolling direction. As a result, the strip can be further processed more independently of the rolling direction and thus more flexibly.

Even after a heat treatment of 2 min. at 150° C., strip A shows good strength values. This means that even after a drying step (e.g. in the drying device 28 in FIG. 3), strip A still has good strength values, so that the aluminium strip can continue to be processed well and allows longer lifetimes for the lithium-ion accumulators made from it. Conversely, the higher strength values also allow the final thickness of the aluminium strip to be reduced without the strength values dropping too much, so that material, weight and space can be saved in the manufacture of lithium-ion accumulators.

For samples of strips with a thickness of 15 µm and 20 µm, the number of phases was determined with a diameter length of 0.1-1.0 µm and a diameter length of >1 µm.

The alloy composition of the samples is as follows:

TABLE 5

| (all data in % by weight) | | | | | | | | |
|---|---|---|---|---|---|---|---|---|
| Si | Fe | Cu | Mn | Mg | Zn | Ti | other | Al |
| 0.1100 | 0.2000 | 0.0500 | 0.0200 | 0.0200 | 0.0100 | 0.0200 | <0.005 | Rest |

The samples were mechanically prepared with an oxide polishing suspension. The maximum diameter lengths were determined with a field emission scanning electron microscope (Zeiss Merlin) with B2D4 detector (pneumatically operated detector for field emission scanning electron microscope) at a magnification of 1000× and an acceleration voltage of 10 kV. The results for particles with a maximum diameter length of 0.1-1.0 µm are shown in Table 6:

TABLE 6

| Thickness | Number of phases (max. diameter length 0.1-1.0 µm)/mm$^2$ |
|---|---|
| 15 µm | 4 × 10$^3$ |
| 12 µm | 3 × 10$^3$ |

The results for particles with a diameter length >1.0 µm are shown in Table 7:

TABLE 7

| Thickness | Number of phases (diameter length > 1.0 µm)/mm$^2$ |
|---|---|
| 15 µm | 4 × 10$^3$ |
| 12 µm | 4 × 10$^3$ |

This shows that the battery electrode foils of the invention have both high strength and fine particle distribution.

The invention claimed is:
1. A battery electrode foil comprising an aluminium alloy, wherein the aluminium alloy comprises the following composition in weight percent:

Si: 0.07-0.12% by weight,
Fe: 0.18-0.24% by weight,
Cu: 0.03-0.08% by weight,
Mn: 0.015-0.025% by weight,
Zn: ≤0.01% by weight, and
Ti: 0.015-0.025% by weight,
wherein the aluminium alloy can contain impurities of up to a maximum of 0.01% for each compound, in total up to a maximum of 0.03%,
wherein the remaining weight % of the aluminum alloy is aluminium, with the proviso that the aluminium content must be at least 99.5% by weight;
wherein the battery electrode foil has intermetallic phases of a diameter length of 0.1 to 1.0 μm with a density of ≤9500 particles/mm$^2$, and
wherein the battery electrode foil has a thickness of 8 to 20 μm.

2. The battery electrode foil according to claim 1, wherein the battery electrode foil has intermetallic phases of a diameter length of 0.1 to 1.0 μm with a density of ≤7000 particles/mm$^2$.

3. The battery electrode foil according to claim 1, wherein the battery electrode foil has a minimum electrical conductivity of 56% IACS.

4. The battery electrode foil according to claim 1, wherein the battery electrode foil has a tensile strength (in the direction of rolling and transverse to the direction of rolling) Rm >250 MPa.

5. The battery electrode foil according to claim 1, wherein said battery electrode foil has a surface roughness Ra of 0.07 to 0.22 μm on both sides.

6. The battery electrode foil according to claim 5, wherein the difference in surface roughness Ra on both sides of the battery electrode foil is at most 0.03 μm.

7. The battery electrode foil according to claim 1, wherein the battery electrode foil has a carbon coverage of <5 mg/m$^2$.

8. The battery electrode foil according to claim 1, wherein the surface tension of the battery electrode foil is >30 dyn/cm.

9. The battery electrode foil according to claim 8, wherein the surface tension of the battery electrode foil is >32 dyn/cm.

10. The battery electrode foil according to claim 1, wherein the battery electrode foil has a thickness of 12 μm.

11. The battery electrode foil according to claim 1, wherein the battery electrode foil has the following mechanical properties:
Rm (in direction of rolling): ≥250 MPa,
Rm (transverse to rolling direction): ≥250 MPa,
Rp0.2 (in rolling direction): ≥200 MPa,
Rp0.2 (transverse to rolling direction): ≥200 MPa,
A100 (in rolling direction): ≥2.0%,
A100 (transverse to rolling direction) ≥2.0%.

12. The battery electrode foil according to claim 1, characterised in that the Fe/Si ratio is in the range of 1.5 to 3.5.

13. The battery electrode foil according to claim 1, characterised in that the Cu/Ti ratio is in the range of 2 to 5.

14. A method of manufacturing a battery electrode foil, comprising:
producing an aluminium hot-rolled strip with a hot-rolled thickness of at least 2.5 mm is provided from an aluminium alloy as described in claim 1, and
cold rolling the aluminium hot strip in several cold rolling passes to a final thickness of 8 to 20 μm,
wherein cold rolling is carried out from an initial thickness of at least 1 mm without intermediate annealing.

15. The method according to claim 14, wherein cold rolling from a hot strip thickness to the final thickness is carried out without intermediate annealing.

16. The method according to claim 14, characterised in that the degree of rolling per cold rolling pass is at most 60% from an initial thickness of at least 0.55 mm.

17. The method according to claim 14, characterised in that the aluminium strip, starting from a thickness of at least 0.1 mm, is cooled between two cold rolling passes.

18. The method according to claim 14, characterised in that the aluminium strip is cold-rolled in a single layer to the final thickness.

19. A battery electrode foil produced by a method according to claim 14.

20. A method of making an accumulator, the method comprising:
using the battery electrode foil according to claim 1 as a current collector foil, in the manufacture of an accumulator.

21. An accumulator comprising a current collector made of a battery electrode foil according to claim 1.

* * * * *